016
United States Patent [19]

Schimmel et al.

[11] 4,081,343

[45] Mar. 28, 1978

[54] PROCESS FOR CATIONIC ELECTRODEPOSITION

[75] Inventors: Karl F. Schimmel, Verona; Percy E. Pierce, Monroeville; James E. Jones, Lower Burrell, all of Pa.

[73] Assignee: PPG Industries, Inc., Pittsburgh, Pa.

[21] Appl. No.: 738,785

[22] Filed: Nov. 3, 1976

Related U.S. Application Data

[62] Division of Ser. No. 601,108, Aug. 1, 1975, Pat. No. 4,007,154.

[51] Int. Cl.² .......................................... C25D 13/10
[52] U.S. Cl. ................................................ 204/181 C
[58] Field of Search ........................................ 204/181

[56] References Cited

U.S. PATENT DOCUMENTS

| | | | |
|---|---|---|---|
| 3,925,180 | 12/1975 | Jerabek | 204/181 |
| 3,935,087 | 1/1976 | Jerabek et al. | 204/181 |
| 3,936,405 | 2/1976 | Stuoni et al. | 204/181 |

*Primary Examiner*—Howard S. Williams
*Attorney, Agent, or Firm*—William J. Uhl

[57] ABSTRACT

A pigment paste suitable for use in cationic electrodeposition is disclosed. The paste contains pigment dispersed in a resinous vehicle which is the reaction product of an epoxy-containing organic material and an organic tertiary amine acid salt containing blocked isocyanate groups capable of unblocking at elevated temperature.

5 Claims, No Drawings

PROCESS FOR CATIONIC ELECTRODEPOSITION

This is division of application Ser. No. 601,108, filed Aug. 1, 1974, now U.S. Pat. No. 4,007,154.

BACKGROUND OF THE INVENTION

1. Field of the Invention

The present invention relates to novel pigment pastes suitable for use in cationic electrodeposition, and also relates to the method of cationic electrodeposition employing paints containing the novel pigment paste.

2. Brief Description of the Prior Art

In the formation of paint compositions, and especially electrodepositable paint compositions, an important factor is the introduction of pigments into the coating composition. The pigments are typically ground in a pigment grinding vehicle which acts as a dispersing agent to form a paste, and the resultant pigment paste is incorporated into the coating composition to give the coating composition proper color, opacity, application and film properties. Unfortunately, many of the pigment pastes for electrodeposition are mixtures of water-soluble soaps or resins which are not electrodepositable. These pastes remain the aqueous phase where they pose serious effluent problems.

The present invention overcomes this problem by providing a pigment paste containing a pigment grinding vehicle which is electrodepositable and codeposits with the vehicle resin of the paint. In addition, the grinding vehicle contains blocked isocyanate groups which are capable of unblocking at room or elevated temperatures and reacting with active hydrogens which are contained in the pigment grinding vehicle or in the main resin vehicle for electrodeposition. This results in an increase in crosslink density of the electrodeposited coating and for improved detergent and corrosion resistance.

CROSS-REFERENCE TO RELATED APPLICATIONS

In application Ser. No. 601,111, filed Aug. 1, 1975, now U.S. Pat. No. 4,009,133, there is disclosed a resinous vehicle suitable for use as a coating resin in cationic electrodeposition. The present application resides in the discovery that certain of these vehicles are particularly well suited for use as grinding vehicles for pigment paste.

SUMMARY OF THE INVENTION

In accordance with the present invention, a pigment paste suitable for cationic electrodeposition is provided. The paste comprises a resinous grinding vehicle which is the reaction product of an epoxy-containing organic material and an organic tertiary amine acid salt containing blocked isocyanate groups. A pigment is dispersed in the grinding vehicle such that the pigment-to-resinous vehicle weight ratio is at least 2:1. The blocked isocyanate groups in the grinding vehicle are capable of unblocking at elevated temperature to react with active hydrogens in the grinding vehicle or with active hydrogens contained in the electrocoating resin.

In another aspect of the invention, a method of electrocoating an electrically-conductive surface serving as a cathode in an electric circuit comprising the cathode and an anode and an electrodepositable composition is provided. The electrodepositable composition comprises an aqueous dispersion of polyamine-containing resin which contains active hydrogens and the pigment paste described immediately above.

DETAILED DESCRIPTION

The organic polyepoxides can be a monomeric or polymeric compound or a mixture of compounds having a 1,2-epoxy equivalency greater than 1.0, that is, in which the average number of 1,2-epoxy groups per molecule is greater than 1. It is preferred that the organic polyepoxide by polymeric or resinous.

The polyepoxide can by any of the well-known epoxides. Examples of these polyepoxides have, for example, been described in U.S. Pat. Nos. 2,467,171; 2,615,007; 2,716,123; 3,030,336; 3,053,855; and 3,075,999. A useful class of polyepoxides are the polyglycidyl ethers of polyphenols, such as Bisphenol A. These may be prepared, for example, by etherification of a polyphenol with epichlorohydrin or dichlorohydrin in the presence of an alkali. The phenolic compound may be bis(4-hydroxy-phenyl)2,2-propane; 4,4'-dihydroxybenzophenone; bis(4-hydroxy-phenyl)1,1-ethane; bis(4-hyroxy-phenyl)1,1-isobutane; bis(4-hydroxy-tertiarybutyl-phenyl)2,2-propane; bis(2-hydroxy-naphthyl)methane; 1,5-hydroxy-naphthalene; or the like. Another quite useful of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis-(4-hydroxy-cyclohexyl)2,2-propane, and the like.

There can also be employed polyglycidyl ethers of polycarboxylic acids which are produced by the reaction of epichorohydrin or a similar epoxy compound with an aliphatic or aromatic polycarboxylic acid, such as oxalic acid, succinic acid, glutaric acid, terephthalic acid, 2,6-naphthalene dicarboxylic acid, dimerized linoleic acid and the like. Examples are diglycidyl adipate and diglycidyl phthalate.

Also useful are polyepoxides derived from the epoxidation of an olefinically unsaturated alicyclid compound. Included are diepoxides comprising, in part one or more monoepoxides. These polyepoxides are non-phenolic and obtained by epoxidation of alicyclic olefins, for example, by oxygen and selected metal catalyst, by perbenzoic acid, by acid-aldehyde monoperacetate or by peracetic acid. Among the polyepoxides are the epoxy alicyclic ethers and esters which are well known in the art.

Other epoxides which may be employed are acrylic polymers containing epoxy groups and hydroxyl groups. Preferably, these acrylic polymers are polymers produced by copolymerizing an unsaturated epoxy-containing monomer, such as, for example, glycidyl acrylate or methacrylate, a hydroxyl-containing unsaturated monomer and at least one other unsaturated monomer.

Any polymerizable monomeric compound containing at least one $CH_2=C<$ group, preferably in the terminal position, may be polymerized with the unsaturated glycidyl compounds. Examples of such monomers include aromatic compounds such as phenyl compounds, for example, styrene, alpha-methyl styrene, vinyl toluene and the like. Also, aliphatic compounds such as olefinic acids and esters, such as acrylic acid, methyl acrylate, ethyl acrylate, methyl methacrylate and the like may be employed.

In carrying out the polymerization reaction, techniques well known in the art may be employed. A peroxygen-type catalyst is ordinarily utilized; diazo compounds or redox catalyst systems can also be employed as catalysts.

The preferred hydroxy-containing unsaturated monomers are hydroxyalkyl acrylates, for example, hydroxyethyl acrylate or methacrylate or hydroxypropyl acrylate or methacrylate may be used.

Another method of producing acrylic polymers which may be utilized in the present invention is to react an acrylic polymer containing reactive sites, including hydroxyl groups, with an epoxy-containing compound such as diglycidyl ether of Bisphenol A or other polyepoxides as enumerated elsewhere herein, to provide epoxy group-containing hydroxyl group-containing acrylic polymers.

The organic tertiary amine acid salt containing blocked isocyanate moieties is capable of reacting with and opening the epoxide moiety to form quaternary ammonium-containing adducts. The amine may be aliphatic, mixed aliphatic-aromatic, aralkyl or cyclic. The acid of the tertiary amine acid salt is preferably an acid having a $pK_a$ less than 5 such as hydrochloric acid, sulfuric acid and boric acid. Preferably, the acid is an organic acid such as acetic acid and lactic acid, with lactic acid being the most preferred.

In order to incorporate blocked isocyanate moieties into the amine molecule, the amine should contain an active hydrogen. The term "active hydrogen" refers to hydrogens which, because of their position in the molecule, display activity according to the Zerewitinoff test as described by Kohler in *Journal of the American Chemical Society*, 49, 3181 (1927). Examples of active hydrogens would be those attached to oxygen, nitrogen and sulfur. Examples of tertiary amines which contain active hydrogens include hydroxy-containing tertiary amines such as dimethyl ethanolamine, methyl diethanolamine, dimethylamino-2-propanol, diethylaminoethoxyethanol and di-n-propanolamine.

In the preferred manner of preparing the grinding vehicle, the organic polyisocyanate is partially blocked or capped with the blocking agent and the partially capped product then reacted with the amine.

The reaction between the organic polyisocyanate and the blocking agent may optionally be conducted in the presence of a urethane forming catalyst. The reactin is usually exothermic, therefore, the polyisocyanate and the blocking agent are preferably admixed at no higher than 100° C. and preferably below 50° C. to minimize the exotherm effect.

The partially blocked or capped polyisocyanate is then usually reacted with an active hydrogen-containing tertiary amine through the active hydrogen functionality under conditions which will not unblock the isocyanate. Preferably, one equivalent of the partially capped polyisocyanate is reacted with one equivalent of the active hydrogen-containing tertiary amine which results in fully capping the isocyanate making it part of the amine molecule. The reaction between the partially capped polyisocyanate and the active hydrogen-containing tertiary amine is conducted at low or moderate temperature and optionally in the presence of a urethane-forming catalyst. Generally, reaction temperature is less than 100° C. to preserve the capped isocyanate groups and to avoid gelling of the product. Typical reaction temperatures are between 30° to 90° C. The reaction may be conducted in the presence of a solvent if desired. If the solvent is employed, preferably it is capable of being used in the ultimate composition which is formed. Suitable solvents are those which do not contain active hydrogens and include, for example, ketones and ethers. It may be desirable to have present in the coating composition a catalyst for urethane formation so that when the blocked isocyanates unblock during curing of the electrodeposited coating, crosslinking will be complete. However, if curing temperatures after electrodeposition are high enough, catalyst may not be needed. Examples of urethane-forming catalysts are the tin compounds such as dibutyltin dilaurate, dibutyltin acetate and dibutyltin oxide, which are preferred, but other catalysts for urethane formation known in the art may be employed. Usually up to about 5 percent by weight catalyst based on total reactant weight is employed.

The adduct of the partially capped polyisocyanate and the tertiary amine containing active hydrogens is reacted with an acid to form the corresponding tertiary amine acid salt.

The isocyanate precursor of the blocked isocyanates moiety may be derived from an organic polyisocyanate, preferably an organic diisocyanate. Representative examples are the aliphatic diisocyanates such as tetramethylene and hexamethylene diisocyanates; the cycloaliphatic diisocyanates such as 1,3-cyclopentane and 1,4-cyclohexane diisocyanates and isophorone diisocyanate; aromatic diisocyanates such as m-phenylene and 1,4-naphthalene diisocyanates; the aliphatic-aromatic diisocyanates such as 4,4'-diphenylene methane, 2,4- or 2,6-toluene or mixtures thereof and 1,4-xylylene diisocyanates; the nuclear substituted aromatic compounds such as dianisidine diisocyanates, 4,4'-diphenyl ether diisocyanate and chlorodiphenylene diisocyanate. Higher functionality isocyanates such as triisocyanates such as triphenyl-methane-4,4',4"-triisocyanate, 1,3,5-triisocyanate benzene and 2,4,6-triisocyanate toluene; and the tetraisocyanates such as 4,4'-diphenyl-dimethylmethane-2,2',5,5'-tetraisocyanate and the polymerized polyisocyanates such as toluene diisocyanate dimers and trimers and the like may also be used.

In addition, the organic polyisocyanate may be a prepolymer derived from polyols including polyether polyols or polyester polyols, or simple polyols such as glycols, for example, ethylene glycol and propylene glycol, as well as other polyols such as glycerol; trimethylol propane; hexanetriol, pentaerythritol, and the like.

The blocking agent for the organic polyisocyanate can be any suitable aliphatic, cycloaliphatic, aromatic, alkyl monoalcohol, phenolic compound and oxime such as, for example, aliphatic alcohols containing from 1 to 10 carbon atoms, such as methyl, ethyl, chloroethyl, propyl, butyl, amyl, hexyl, heptyl, octyl, nonyl, 3,3,5-trimethyl hexanol, 2-ethyl hexanol, decyl, and the like; the aromatic-alkyl alcohols such as phenyl-carbinol, methyl phenyl-carbinol; alcohols containing ether linkages such as ethyl glycol monoethyl ether, ethyl glycol monobutyl ether, and the like; phenolic compounds such as phenol itself, substituted phenols in which the substituents do not adversely affect the coating operations, such as cresol, xylenol, nitrophenol, chlorophenol, ethylphenol and t-butylphenol. Minor amounts of even higher molecular weight, relatively non-volatile monoalcohols and phenols may be used, if desired, to serve as plasticizers in the coating provided by the present invention. Examples include nonyl phenol, monofunctional polyethylene and polypropylene oxides such as CARBOWAX 550.

Besides the above, additional blocking agents include oximes such as methyl ethyl ketoxime, acetone oxime and cyclohexanone oxime. Use of oximes and phenols is particularly desirable because polyisocyanates blocked with these agents unblock at relatively low temperatures.

The proportions of epoxy containing organic material and organic tertiary amine which are reacted with one another should be selected such that the resinous vehicle contains between 0.3 to 1.5 and preferably about 0.4 to 0.9 milliequivalents of quaternary nitrogen per gram of resin. Lower than the recommended amounts of milliequivalents per gram of resin results in poor pigment wetting properties, whereas higher than the recommended amounts of milliequivalents per gram of resin results in resins which are too water soluble.

The pigment pastes of the present invention are prepared by grinding or dispersing a pigment into the grinding vehicle described above in a manner well known in the art. The pigment paste comprises as essential ingredients the quaternary ammonium pigment grinding vehicle prepared as described above and at least one pigment; however, the paste may, in addition, contain optional ingredients such as plasticizers, wetting agents, surfactants or defoamers.

Grinding is usually accomplished by the use of ball mills, sand mills, Cowles dissolvers, continuous attritors and the like until the pigment has been reduced to the desired size, preferably has been wet by and dispersed by the griding vehicle. After grinding, the particle size of the pigment should be in the range of 10 microns or less, preferably as small as practical. Generally, a Hegman grind gauge reading of about 6–8 is usually employed.

Preferably, grinding is conducted in an aqueous dispersion of the vehicle. The amount of water present in the aqueous grind should be sufficient to produce a continuous aqueous phase. The aqueous grind usually contains about 30–70 percent total solids. The use of more water merely reduces the effective capacity of the mill and, while less water can be employed, higher resultant viscosity may create problems in certain instances. The pigment-binder weight ratio in the grinding step is usually maintained within the range of 2 to 7:1, although depending on the pigments used, higher ratios can be employed.

Pigments which may be employed in the practice of the invention are pigments well known in the art. Generally, titanium dioxide is the sole or chief white pigment; other white pigments and/or extender pigments including antimony oxide, zinc oxide, basic lead carbonate, basic lead sulfate, barium carbonate, China clay, calcium carbonate, aluminum silica, silica, magnesium carbonate, magnesium silica, among others, may be used. Color pigments may also be employed, for example, cadmium yellow, cadmium red, carbon black, phthalocyanine blue, chrome yellow, toluidine red, hydrated iron oxide, among others.

For a general review of the pigment grinding and paint formulation, reference may be had to:

D. H. Parker, *Principles of Surface Coating Technology*, Interscience Publishers, New York (1965)

R. L. Yates *Electropainting*, Robert Draper Ltd., Teddington, England (1966)

H. F. Payne, *Organic Coating Technology, Vol. 2*, Wiley and Sons, New York (1961)

When the pigment paste of the present invention is prepared with the tertiary amine acid salt, it can be combined with a polyamine group-containing resinous vehicle known in the art for cationic electrodeposition. The amine group-containing cationic electrodepositable resins are well known in the art and need not be described in detail. Examples of suitable resins include tertiary amine salt-containing resins such as those described in U.S. patent application Ser. No. 547,327, filed Feb. 5, 1975, now U.S. Pat. No. 3,984,299 to Robert D. Jerabek, and assigned to PPG Industries, Inc., the assignee of the present invention; and quaternary ammonium salt-containing resins such as those described in U.S. Pat. No. 3,839,252 to Bosso et al. The portions of these references which describe suitable electrodepositable resins for cationic electrodeposition are hereby incorporated by reference.

The above-described cationic electrodepositable resins all contain hydroxyl groups. Thus, when the resins and the pigment pastes of the present invention are codeposited by electrodeposition, and the coatings cured at elevated temperatures, the blocked isocyanates unblock, releasing free isocyanate which increases the crosslink density of the coating composition, improving its detergent and corrosion resistance.

Enough of the pigment paste is used so that the final electrodepositable composition (electrodepositable resin plug pigment paste) has the properties required for electrodeposition. In most instances, the final electrodepositable composition has a pigment-to-binder (electrodepositable resin plug pigment dispersant) ratio of between about 0.05 to about 0.5.

For electrodeposition, a bath containing about 5–25 percent by weight solids, that is, pigment plus resinous vehicle, is usually employed. This aqueous composition is then placed in contact with an electrically conductive anode and an electrically conductive cathode in an electric circuit. While in contact with the bath containing the coating composition, an adherent film of the coating composition is deposited on the cathode.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts are usually employed. The current density is usually between about 0.25 ampere and 15 amperes per square foot and tends to decrease during electrodeposition.

The method of the invention is applicable to the coating of any conductive substrate and especially metal, such as steel, aluminum, copper and the like. After deposition, the coating is cured at elevated temperatures sufficient to unblock the blocked isocyanates by any convenient method, such as in baking ovens or with banks of infrared heat lamps. Curing temperatures of at least 100° C., and preferably 125° to 175° C. for at least 10 minutes and usually for about 10 to 30 minutes are employed.

The final electrodepositable composition may contain, in addition to the pigment dispersion and the electrodeposition resin, adjuvant resins such as aminoplast resins for crosslinking, solvents, anti-oxidants, surfactants, and other adjuvants typically employed in the electrodeposition process.

Illustrating the invention are the following examples which are not to be construed as limiting the invention to their details. All parts and percentages in the examples as well as throughout the specification are by weight unless otherwise specified.

EXAMPLE I

An organic tertiary amine acid salt was prepared from the following charge:

| Ingredient | Parts by Weight | Solids |
| --- | --- | --- |
| 2-Ethyl hexanol half-capped toluene diisocyanate in methyl isobutyl ketone | 320.0 | 304 |
| Dimethyl ethanolamine | 87.2 | 87.2 |
| Aqueous lactic acid solution | 117.6 | 88.2 |
| Butyl CELLOSOLVE[1] | 39.2 | — |

[1]Ethylene glycol monobutyl ether.

The 2-ethyl hexanol half-capped toluene diisocyanate was added to the dimethyl ethanolamine in a suitable reaction vessel at room temperature. The mixture exothermed and was stirred for 1 hour at 80° C. Lactic acid was then charged, followed by the addition of butyl CELLOSOLVE. The reaction mixture was stirred for about ½ hour at 65° C. to form the desired quaternizing agent.

EXAMPLE II

A soluble resinous vehicle comprising the reaction product of an epoxy containing organic material and the organic amine containing blocked isocyanate groups as described in Example I was prepared from the following charge:

| Ingredient | Parts by Weight | Solids |
| --- | --- | --- |
| EPON 829[1] | 710.0 | 681.2 |
| Bisphenol A | 289.6 | 289.6 |
| 2-Ethyl hexanol half-capped toluene diisocyanate in methyl isobutyl ketone | 406.4 | 386.1 |
| Quaternizing agent of Example I | 496.3 | 421.9 |
| Deionized water | 71.2 | — |
| Butyl CELLOSOLVE | 56.76 | — |

[1]Epoxy resin solution made from reacting epichlorohydrin and Bisphenol A, having an epoxy equivalent of approximately 193-203 and commercially available from Shell Chemical Company.

The EPON 829 and the Bisphenol A were charged under a nitrogen atmosphere to a suitable reaction vessel and heated to 150°-160° C. to initiate an exotherm. The reaction mixture was permitted to exotherm for 1 hour at 150°-160° C. The reaction mixture was then cooled to 120° C. and the 2-ethyl hexanol half-capped toluene diisocyanate added. The temperature of the reaction mixture was held at 110°-120° C. for 1 hour, followed by the addition of butyl CELLOSOLVE. The reaction mixture was then cooled to 85°-90° C., homogenized and then charged with water, followed by the addition of the quaternizing agent. The temperature of the reaction mixture was held at 80°-85° C. until an acid value of one was obtained.

EXAMPLE III

A pigment paste employing the resinous vehicle of Example II was prepared from the following charge:

| Ingredient | Parts by Weight | Solids |
| --- | --- | --- |
| Resinous vehicle of Example II[1] | 2387.0 | 717.5 |
| Coal dust | 1666.0 | 1666.0 |
| Lead silicate | 204.4 | 204.4 |
| Dibutyltin oxide | 71.4 | 71.4 |
| Deionized water | 609.0 | — |

[1]429.0 parts of the resinous vehicle of Example II thinned with 101 parts of butyl CELLOSOLVE and 470 parts of deionized water to form a 30 percent solids solution.

The above ingredients were ground in an attritor for about 10½ hours to a Hegman No. 6-7. Additional deionized water was added to obtain a more desirable consistency. The pigment paste had a total solids of 54.7 percent, resin solids of 14.2 percent and pigment solids of 40.5 percent.

The paste had excellent thermal stability in that it did not separate or settle out after 7 days in a hot room at 120° C.

EXAMPLE IV

A quaternary ammonium resin suitable as a coating vehicle for cationic electrodeposition was prepared from the following charge:

| Ingredient | Parts by Weight | Solids |
| --- | --- | --- |
| EPON 829 | 1389.6 | 1333.3 |
| Bisphenol A | 448.6 | 448.6 |
| 2-Ethyl hexanol half-capped toluene diisocyanate in methyl isobutyl ketone | 998.6 | 948.6 |
| PCP 0200[1] | 364.7 | 364.7 |
| TEXANOL[2] | 297.3 | — |
| Dimethyl ethanolamine | 6.6 | 6.6 |
| 75% aqueous lactic acid solution | 13.4 | 10.1 |
| Phenyl CELLOSOLVE[3] | 468.5 | — |
| SURFYNOL-104[4] | 51.5 | 51.5 |
| Dimethyl cyclohexylamine lactic acid salt (75% solids in isopropanol) | 409.7 | 307.3 |
| Deionized water | 218.2 | — |
| Ethyl CELLOSOLVE[5] | 218.2 | — |
| Deionized water | 6603.6 | — |

[1]Polycaprolactone diol having a molecular weight of 540 formed from ring opening epsilon-caprolactone with diethylene glycol, commercially available from Union Carbide Corporation.
[2]2,2,4-trimethyl pentanediol-1,3-monoisobutyrate.
[3]Ethylene glycol monophenyl ether.
[4]Tetramethyl decynediol, commercially available from Air Products and Chemicals Company.
[5]Ethylene glycol monoethyl ether.

The EPON 829 and Bisphenol A were charged to a suitable reaction vessel and heated to 150° C. to initiate an exotherm. The temperature was maintained between 150°-159° C. for about 1½ hours. The reaction mixture was then cooled to 125° C., follwed by the addition of the 2-ethyl hexanol half-capped toluene diisocyanate. The reaction mixture was digested at 120° C. for about 1 hour, followed by the addition of the PCP 0200 and TEXANOL. Dimethyl ethanolamine was then added and the reaction mixture heated to 125° C. and held at this temperature for about 7 hours until a Gardner-Holdt viscosity of N (measured at 25° C., 50/50 weight ratio of resin to ethyl CELLOSOLVE) was obtained. The phenyl CELLOSOLVE, ethyl CELLOSOLVE and SURFYNOL-104 were charged to the reaction mixture followed by the sequential addition of lactic acid and the dimethyl cyclohexylamine lactic acid salt solution. The reaction mixture was digested for 2 hours at 90°-95° C. and then thinned with deionized water to form a dispersion having a solids content of 29.0 percent.

EXAMPLE V

The coating resin of Example IV was combined with the pigment paste of Example III in the following charge ratio to form a dispersion suitable for electrodeposition:

| Ingredient | Parts by Weight | Solids |
|---|---|---|
| Resinous vehicle of Example IV | 1930.0 | 558.0 |
| Pigment paste of Example III | 297.0 | 162.0 |
| Deionized water | 1374.0 | — |

The dispersion had a pH of 6.5 and a total solids content of 20 percent. When used as an electrodeposition bath, the bath had a rupture voltage of 350–360 volts and a GM throwpower of 11⅞ inches at 330 volts, bath temperature 29° C., on a 17 inch dip. Zinc phosphated steel panels electrocoated at 330 volts, bath temperature 29° C. for 120 seconds gave continuous films of 0.65–0.75 mil thickness.

We claim:

1. A method of electrocoating an electrically conductive surface serving as a cathode in an electrical circuit comprising said cathode and an anode and an aqueous electrodepositable composition wherein the electrodepositable composition comprises an aqueous dispersion of:
   (A) a cationic polyamine group-containing resin which contains active hydrogens and
   (B) a pigment paste comprising:
      (1) an adduct comprising the reaction product of:
         (a) an organic polyepoxide,
         (b) an organic tertiary amine acid salt containing blocked isocyanate groups capable of unblocking at room temperature or elevated temperature to react with active hydrogens in (A), the tertiary amine acid salt reacting with and opening epoxy moieties in said organic polyepoxide to form quaternary ammonium salt groups,
      (2) a pigment dispersed therein;
   wherein the pigment adduct weight ratio is at least 2:1.

2. The method of electrocoating of claim 1 in which the organic polyepoxide material is a polyglycidyl ether of a polyphenol.

3. The method of electrocoating of claim 2 in which the polyphenol is Bisphenol A.

4. The method of electrocoating of claim 1 in which (b) is the adduct of a hydroxyl-containing tertiary amine and a half-capped diisocyanate.

5. The method of electrocoating of claim 1 in which the isocyanate in (b) is blocked with a member selected from the class consisting of phenol and oximes.

* * * * *

UNITED STATES PATENT AND TRADEMARK OFFICE
CERTIFICATE OF CORRECTION

PATENT NO. : 4,081,343
DATED : March 28, 1978
INVENTOR(S) : Karl F. Schimmel et al It is certified that error appears in the above-identified patent and that said Letters Patent are hereby corrected as shown below:

On the cover sheet, under "References Cited", "Stuoni" should be --Sturni--.

Column 1, line 5, "1974" should be --1975--.

Column 1, line 25, insert --in-- after "remain".

Column 2, line 21, "hyroxy" should be --hydroxy--.

Column 2, line 25, insert --class-- after "useful".

Column 3, line 47, "reactin" should be --reaction--.

Column 6, line 31, "plug" should be --plus--.

Column 6, line 34, "plug" should be --plus--.

Signed and Sealed this

Eighth Day of August 1978

[SEAL]

Attest:

RUTH C. MASON
Attesting Officer

DONALD W. BANNER
Commissioner of Patents and Trademarks